US012307550B2

(12) United States Patent
Ouellette et al.

(10) Patent No.: US 12,307,550 B2
(45) Date of Patent: May 20, 2025

(54) SYSTEMS AND METHODS FOR PROVIDING SECURITY SYSTEM INFORMATION THROUGH SMART GLASSES

(71) Applicant: Tyco Fire & Security GmbH, Neuhausen am Rheinfall (CH)

(72) Inventors: Jason M. Ouellette, Sterling, MA (US); Gopal Paripally, North Andover, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/814,797

(22) Filed: Jul. 25, 2022

(65) Prior Publication Data

US 2024/0029319 A1 Jan. 25, 2024

(51) Int. Cl.
| G06T 11/00 | (2006.01) |
| G02B 27/01 | (2006.01) |
| G06T 7/70 | (2017.01) |
| G06V 20/60 | (2022.01) |

(52) U.S. Cl.
CPC .......... *G06T 11/00* (2013.01); *G02B 27/0172* (2013.01); *G06T 7/70* (2017.01); *G06V 20/60* (2022.01); *G02B 2027/0141* (2013.01); *G02B 2027/0178* (2013.01); *G06T 2200/24* (2013.01)

(58) Field of Classification Search
CPC ....... G06T 11/00; G06T 7/70; G06T 2200/24; G06V 20/60; G02B 27/0172; G02B 2027/0141; G02B 2027/0178
See application file for complete search history.

(56) References Cited

U.S. PATENT DOCUMENTS

| 8,489,065 | B2 * | 7/2013 | Green | G08B 13/19684 |
| | | | | 455/404.1 |
| 10,097,879 | B1 * | 10/2018 | Bates | H04N 21/2181 |
| 10,297,129 | B2 * | 5/2019 | Piccolo, III | G06Q 50/265 |
| 10,481,862 | B2 * | 11/2019 | Ogrinz | H04L 63/1433 |
| 10,769,935 | B2 * | 9/2020 | Frenette | G06Q 10/20 |
| 10,878,240 | B2 * | 12/2020 | Laycock | G06V 20/20 |
| 10,991,162 | B2 * | 4/2021 | Jones | G06F 3/016 |
| 11,048,647 | B1 * | 6/2021 | Johansson | G06F 13/10 |
| 11,468,641 | B2 * | 10/2022 | Koohmarey | H04L 67/125 |
| 11,676,228 | B2 * | 6/2023 | Copley | G06Q 10/0637 |
| | | | | 705/7.23 |

(Continued)

*Primary Examiner* — Abderrahim Merouan
(74) *Attorney, Agent, or Firm* — ArentFox Schiff LLP (57) ABSTRACT

Example implementations include a method, apparatus and computer-readable medium at a computing device for providing security system information using smart glasses, comprising receiving location information of the smart glasses in an environment comprising a plurality of security devices, wherein each security device outputs unique security system information about the environment. The implementations further include identifying at least one security device that is associated with a location with the smart glasses based on the location information. Additionally, the implementations further include retrieving the security system information from the at least one security device. Additionally, the implementations further include generating a user interface element based on the security system information. Additionally, the implementations further include transmitting the user interface element for display on a user interface of the smart glasses.

20 Claims, 5 Drawing Sheets

(56) References Cited

U.S. PATENT DOCUMENTS

| | | | |
|---|---|---|---|
| 11,749,096 B2* | 9/2023 | Kulkarni | G08B 25/007 |
| | | | 340/506 |
| 2011/0087988 A1* | 4/2011 | Ray | G06Q 50/16 |
| | | | 715/771 |
| 2011/0275432 A1* | 11/2011 | Lutnick | G07F 17/3244 |
| | | | 463/25 |
| 2012/0105202 A1* | 5/2012 | Gits | G01S 5/0054 |
| | | | 340/8.1 |
| 2013/0031202 A1* | 1/2013 | Mick | G06F 3/00 |
| | | | 709/217 |
| 2014/0050455 A1* | 2/2014 | Ni | H04N 7/181 |
| | | | 386/E5.028 |
| 2015/0028993 A1* | 1/2015 | Dyk | G07C 9/00309 |
| | | | 340/5.5 |
| 2015/0325047 A1* | 11/2015 | Conner | G06F 3/04847 |
| | | | 345/633 |
| 2015/0327010 A1* | 11/2015 | Gottschalk | G05B 15/02 |
| | | | 455/456.1 |
| 2017/0091998 A1* | 3/2017 | Piccolo, III | G06Q 50/163 |
| 2017/0301165 A1* | 10/2017 | GrandPre | G07C 9/00309 |
| 2018/0151039 A1* | 5/2018 | Lemberger | H04L 12/4625 |
| 2020/0105250 A1* | 4/2020 | Patel | G10L 15/07 |
| 2023/0052463 A1* | 2/2023 | Spivack | G07D 7/0043 |
| 2023/0260387 A1* | 8/2023 | Latham | G05B 23/0224 |
| | | | 340/517 |
| 2024/0196049 A1* | 6/2024 | Leigh | H04N 21/44004 |

* cited by examiner

ND METHODS FOR PROVIDING
SYSTEMS AND METHODS FOR PROVIDING SECURITY SYSTEM INFORMATION THROUGH SMART GLASSES

TECHNICAL FIELD

The described aspects relate to smart wearable devices and security systems.

BACKGROUND

Smart glasses display information to wearers through private user interfaces that seem integrated with the environment that the wearers are viewing. Although smart glasses hold great potential, they are limited in processing power due to their physical size, and this confines their usability. Because glasses are a prominent part of fashion and need to be comfortable to wear for long periods of time, chunky smart glasses with large hardware components may be impractical.

The lack of processing power has prevented smart glasses from being used in large-scale security systems. Accordingly, aspects of the present disclosure relate generally to smart wearable devices and security systems, and more particularly, to providing security system information through smart glasses.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method at a computing device for providing security system information using smart glasses, comprising receiving location information of the smart glasses in an environment comprising a plurality of security devices, wherein each security device outputs unique security system information about the environment. The method further includes identifying at least one security device that is associated with a location with the smart glasses based on the location information. Additionally, the method further includes retrieving the security system information from the at least one security device. Additionally, the method further includes generating a user interface element based on the security system information. Additionally, the method further includes transmitting the user interface element for display on a user interface of the smart glasses.

Another example aspect includes an apparatus at a computing device for providing security system information using smart glasses, comprising a memory and a processor coupled with the memory. The processor is configured to receive location information of the smart glasses in an environment comprising a plurality of security devices, wherein each security device outputs unique security system information about the environment. The processor is further configured to identify at least one security device that is associated with a location with the smart glasses based on the location information. Additionally, the processor further configured to retrieve the security system information from the at least one security device. Additionally, the processor further configured to generate a user interface element based on the security system information. Additionally, the processor further configured to transmit the user interface element for display on a user interface of the smart glasses.

Another example aspect includes an apparatus at a computing device for providing security system information using smart glasses, comprising means for receiving location information of the smart glasses in an environment comprising a plurality of security devices, wherein each security device outputs unique security system information about the environment. The apparatus further includes means for identifying at least one security device that is associated with a location with the smart glasses based on the location information. Additionally, the apparatus further includes means for retrieving the security system information from the at least one security device. Additionally, the apparatus further includes means for generating a user interface element based on the security system information. Additionally, the apparatus further includes means for transmitting the user interface element for display on a user interface of the smart glasses.

Another example aspect includes a computer-readable medium having instructions stored thereon for a computing device providing security system information using smart glasses, wherein the instructions are executable by a processor to receive location information of the smart glasses in an environment comprising a plurality of security devices, wherein each security device outputs unique security system information about the environment. The instructions are further executable to identify at least one security device that is associated with a location with the smart glasses based on the location information. Additionally, the instructions are further executable to retrieve the security system information from the at least one security device. Additionally, the instructions are further executable to generate a user interface element based on the security system information. Additionally, the instructions are further executable to transmit the user interface element for display on a user interface of the smart glasses.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes systems and methods for providing security system information through smart glasses. As discussed previously, smart glasses have a limited amount of processing capabilities as compared to full fledged computers. Because security system information generally requires a relatively large amount of storage and processing resources, as compared to other simpler types of information, the present disclosure describes utilizing the location and perspective view of the smart glasses to determine which subset of the security system information should be provided and displayed on the smart glasses. By efficiently limiting the amount of data being transmitted to the smart glasses based on data relevancy, one or more of the resource constraint weaknesses of smart glasses are overcome.

Figure 1:
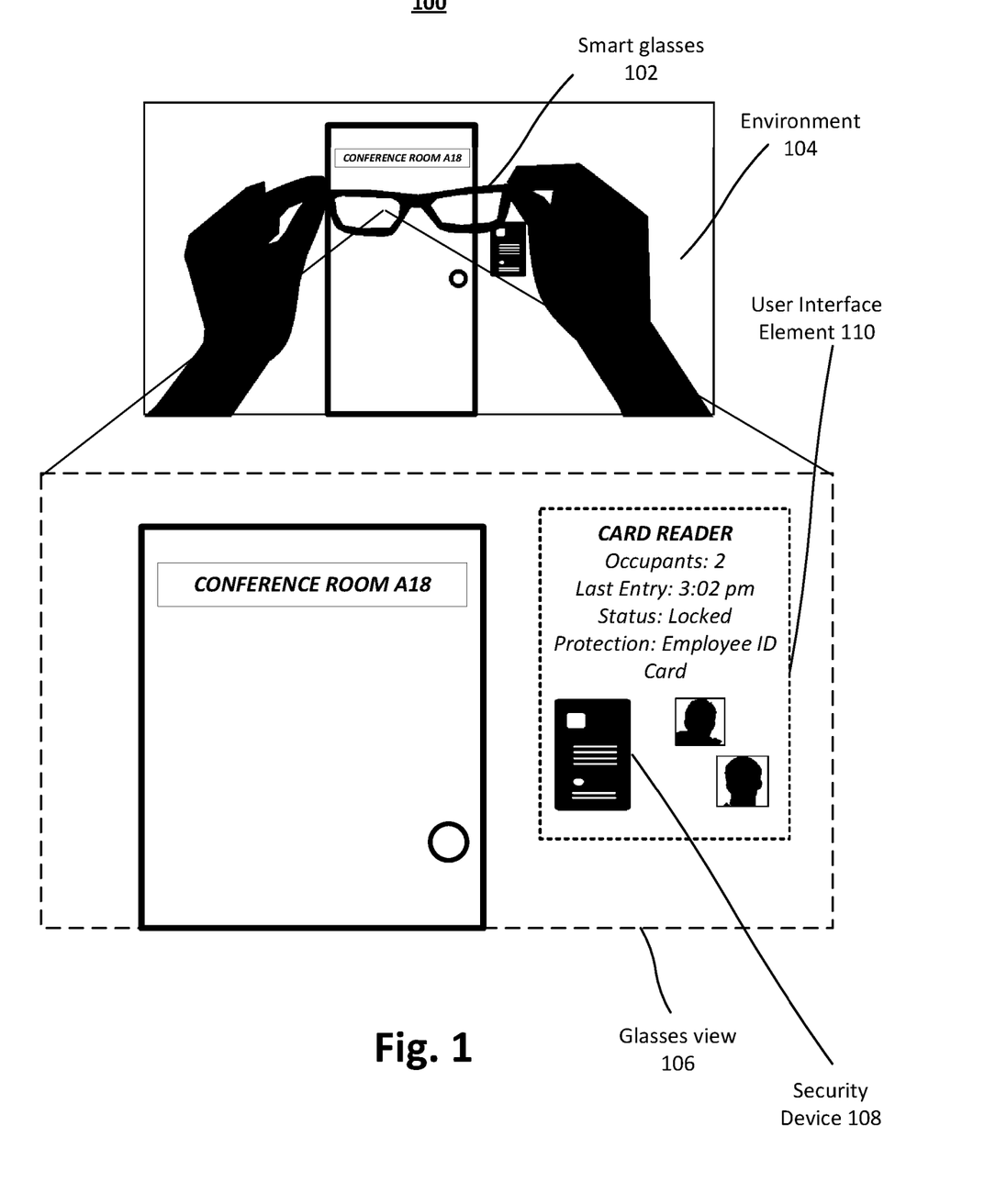
FIG. 1 is a diagram of an exemplary scenario in which smart glasses are used to view security system information, in accordance with exemplary aspects of the present disclosure.

FIG. 1 is a diagram of exemplary scenario 100 in which smart glasses are used to view security system information, in accordance with exemplary aspects of the present disclosure. Scenario 100 depicts smart glasses 102 being used in environment 104. For example, environment 104 may be an office building with a plurality of spaces including employee offices, hallways, bathrooms, cafeterias, etc. Glasses view 106 depicts what a wearer sees when using smart glasses 102. In the example, the wearer is outside of conference room A18, which is accessed using security device 108. For example, security device 108 may be a card reader that locks and unlocks the door of conference room A18 based on the access rights associated with a scanned employee identity (ID) card.

When wearing smart glasses 102, the wearer sees user interface (UI) element 110 hovering over and/or within a vicinity of security device 108. UI element 110 may be an image or an augmented reality effect that depicts security system information specifically pertaining to security device 108 and/or an area associated with security device 108. For example, UI element 110 may include a status of security device 108 (e.g., "locked" or "unlocked"). Depending on the type of security device 108 that the wearer is viewing, UI element 110 may include information about how the security device 108 is used and has been historically interacted with. For example, in scenario 100, UI element 110 includes protection information (i.e., interact with security device 108 with an employee ID card), the last known interaction (e.g., "3:02 pm"), and the number of times security device 108 has been interacted with in a given period of time (e.g., "2" occupants suggests that at least two people interacted with security device 108 in the past hour). UI element 110 may further include images of the occupants (e.g., photos from the employee ID cards).

It should be noted that UI element 110 is only visible in glasses view 106. For example, if the wearer were to remove smart glasses 102 or power them off, UI element 110 would no longer be visible. UI element 110 may be displayed on smart glasses 102 with a projector of smart glasses 102 that casts images (such as UI element 110) on the lens of smart glasses 102. The projector may adjust the position on the lens where the image is displayed. This gives the illusion of the image being overlaid on environment 104.

Figure 2:
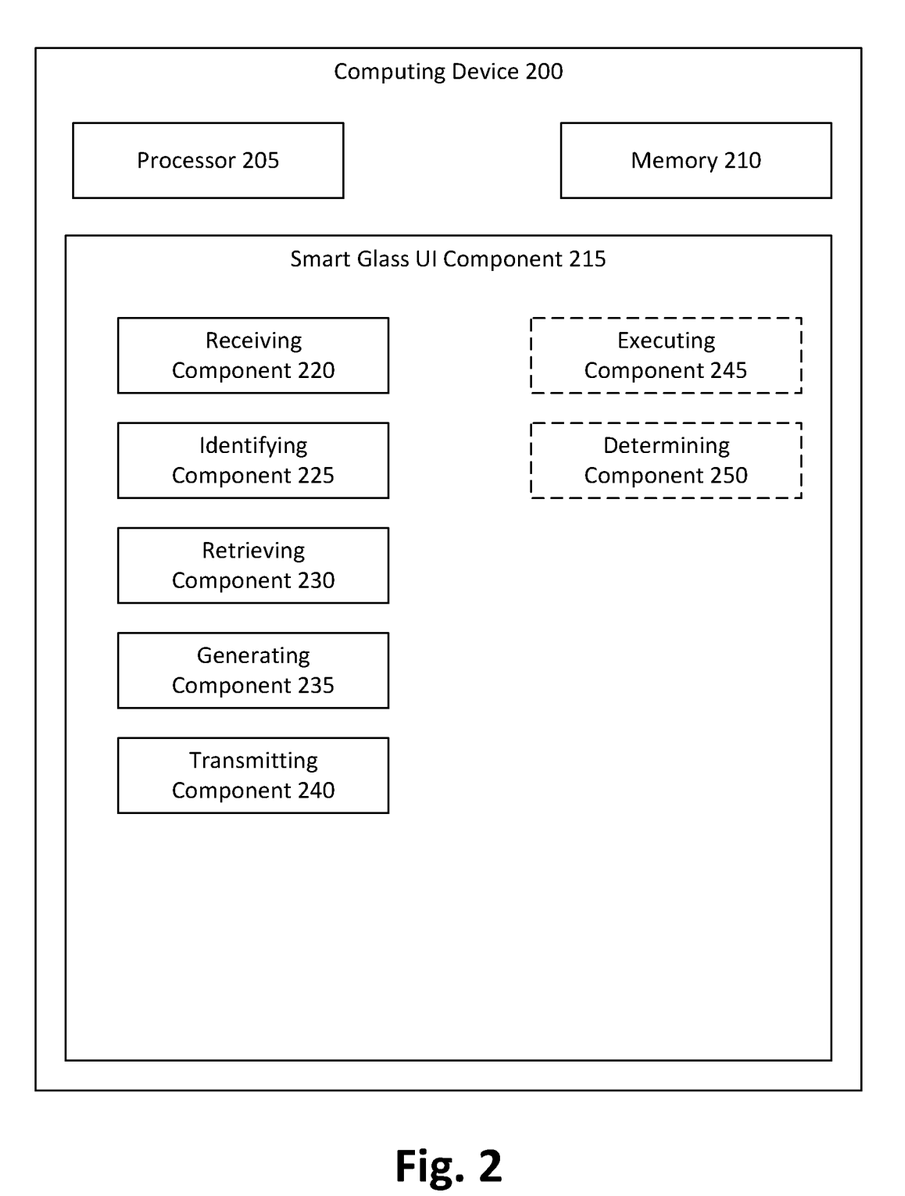
FIG. 2 is a block diagram of a computing device executing a smart glass user interface (UI) component, in accordance with exemplary aspects of the present disclosure.
Figure 3:
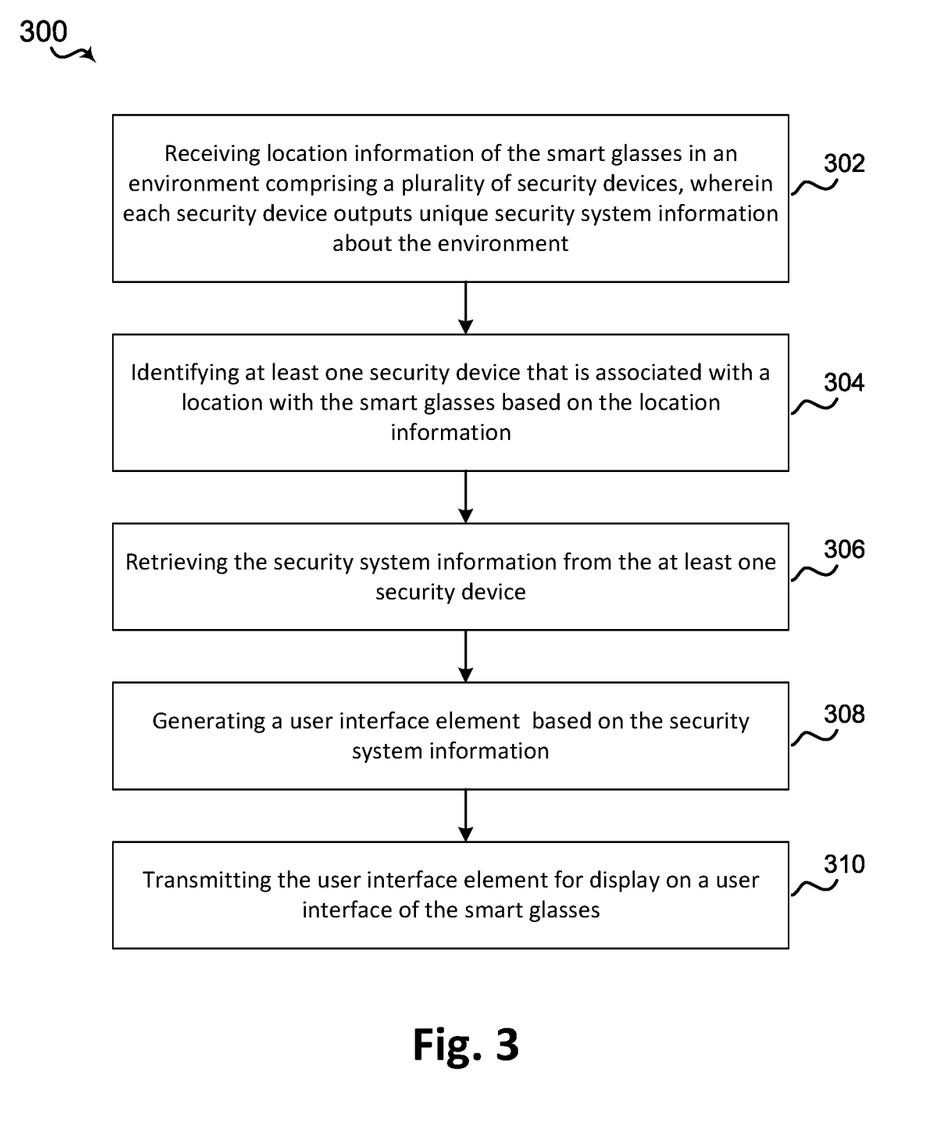
FIG. 3 is a flowchart illustrating a method for providing security system information through smart glasses, in accordance with exemplary aspects of the present disclosure.

Referring to FIG. 2 and FIG. 3, in operation, computing device 200 may perform a method 300 of wireless communication, by such as via execution of smart glass UI component 215 by processor 205 and/or memory 210. In some aspects, computing device 200 may be server connected to at least one pair of smart glasses and a plurality of security devices in an environment being monitored.

At block 302, the method 300 includes receiving location information of the smart glasses in an environment comprising a plurality of security devices, wherein each security device outputs unique security system information about the environment. For example, in an aspect, computing device 200, processor 205, memory 210, smart glass UI component 215, and/or receiving component 220 may be configured to or may comprise means for receiving location information of smart glasses 102 in environment 104 comprising a plurality of security devices (including security device 108), wherein each security device outputs unique security system information about environment 104.

Environment 104 may be any space such as a school, a campus, an office building, an airport, etc., where security devices are installed. These security devices may include, but are not limited to, surveillance cameras, thermometers, moisture detectors, carbon monoxide detectors, card readers, biometrics readers (e.g., implementing fingerprint, retina, facial detection), and door locks. In some cases, environment 104 may be a large space divided into a plurality of smaller spaces. For example, an office building may be divided up into employee offices, a cafeteria, bathrooms, etc. Each space may have its own set of security devices. For example, there may be a security camera installed in the hallway that faces a conference room and the conference room may have a door that is linked to a card reader. This example is showcased in FIG. 1. Rather than overwhelming smart glasses 102 with information about all security devices in environment 104, the present disclosure describes identifying a subset of security system information that is most relevant to the wearer of smart glasses 102 at a given time. This subset may include information received from a select few security devices that are physically closest to smart glasses 102.

Accordingly, receiving component 220, which may be installed on a computing device connected to smart glasses 102 via a local area network (LAN) or a wide area network (WAN), may receive location information from smart glasses 102. In some aspects, the location information includes global positioning system (GPS) coordinates of smart glasses 102. In some aspects, the location information may be a qualitative value describing a space in environment 104. For example, the location information may be "Hallway 1." While the former can be determined using a GPS receiver installed in smart glasses 102, the latter may be determined using a localization algorithm.

In some aspects, computing device 200, processor 205, memory 210, smart glass UI component 215, and/or executing component 245 may be configured to or may comprise means for executing a localization algorithm that assigns the location of the smart glasses to the known location based on identifying the at least one security device in an input image. For example, smart glasses 102 may be equipped with a camera that periodically captures images. An image may include glasses view 106. Smart glasses 102 may transmit the image(s) to a computing device executing smart glass UI component 215. Smart glass UI component 215 may detect a security device in the image and attempt to identify the security device. Identifying the security device may include determining a unique identifier of the security device (e.g., a serial code, a color scheme, a physical layout) relative to identifiers of other security devices in environment 104. In another example, identifying the security device first involves detecting, in an image captured by the smart glasses, an identifier of the location and subsequently determining which security devices are located in the location. In some aspects the identifier of the location is a number (e.g., a room number), an object (e.g., a window unique to the location), a visual sign (e.g., a pattern unique to the location), or a unique code (e.g., a QR code on the door).

In an alternative or additional aspect, the at least one security device is a card reader of an access system that enables and disables access through a security door, wherein the security system information includes personnel identification information and/or card identification information associated with one or more cards scanned at the card reader over a period of time.

Smart glass UI component 215 may further maintain a security system database that includes location (e.g., GPS coordinates, qualitative values), status, historical usage, and other security system information associated with each security device in environment 104. A portion of an example security system database is shown in Table 1 below, where column headers identify a type of security information and rows include corresponding values of the respective types of security information:

TABLE 1

| Security Device ID | Security Device Type | Location | Status | ... | Historical Usage |
|---|---|---|---|---|---|
| H12FJIDF | Thermostat | Hallway 1 | 78 F. | ... | [1:00pm-80 F.] |
| DFDFS134 | Camera | Office 1 | Active | ... | [12:14pm-Motion Detected] |
| ... | ... | ... | ... | ... | ... |
| AF23KJ78 | Card Reader | Conference Room A18 | Locked | | [3:02pm-Last Entry-by Employee439] |
| AFZFS156 | Camera | Conference Room A18 | Active | ... | [3:14pm-Motion Detected] |

Suppose that smart glass UI component 215 detects the term "conference room A18" in the image received from smart glasses 102. Smart glass UI component 215 may refer to the security system database above and determine that the image includes a card reader outside of conference room A18.

Suppose that security device 108 includes a serial code "AF23KJ78" that is visible in the image. Smart glass UI component 215 may detect the serial code and also determine that the image includes a card reader outside of conference room A18.

In this case, the location information received is in the form of the image and using the security system database, smart glass UI component 215 determines the location of smart glasses 102 in environment 104.

At block 304, the method 300 includes identifying at least one security device that is associated with a location with the smart glasses based on the location information. For example, in an aspect, computing device 200, processor 205, memory 210, smart glass UI component 215, and/or identifying component 225 may be configured to or may comprise means for identifying at least one security device that is associated with a location with the smart glasses based on the location information.

For example, identifying component 225 may determine, using the security system database, that a card reader and a camera are present outside of conference room A18 (i.e., the locations of the security devices match "conference room A18"). In another example, the location information may include GPS coordinates of smart glasses 102 and the security system database may include GPS coordinates of each security device in environment 104. Identifying component 225 may determines that a security device is associated with, and in particular shares, a location with the smart glasses if the GPS coordinates of the security device is within a threshold distance from the GPS coordinates of the smart glasses. It should be noted that a user does not need to be in the same room as the security device so long as the security device is in a line of sight of the glasses. For example, a user outside a room (e.g., in a hall) could look at a door to a room (or a security device associated with the door) and see information from security devices in the room (e.g., occupants, temperature, smoke, threat level, etc.) using the smart glasses.

At block 306, the method 300 includes retrieving the security system information from the at least one security device. For example, in an aspect, computing device 200, processor 205, memory 210, smart glass UI component 215, and/or retrieving component 230 may be configured to or may comprise means for retrieving the security system information from the at least one security device.

For example, each security device in environment 104 may periodically transmit security system information to computing device 200 associated with environment 104. In reference to FIG. 1, security device 108 may periodically transmit information to the computing device 200 whenever there is an interaction with the card reader. For example, whenever a person successfully enters or is rejected from conference room A18 due to a card scan at the card reader, security device 108 may transmit the information about the interaction and a timestamp to computing device 200. Similarly, if a device such as a camera detects motion, the camera may transmit a set of frames capturing the motion and a timestamp to computing device 200. In yet another example, a thermostat may transmit temperature settings to computing device 200 whenever the temperature is adjusted (either manually by a person or automatically).

Computing device 200 is configured, using smart glass UI component 215, to populate the received information in the security system database. In the event that smart glasses 102 are determined to be in a particular location, smart glass UI component 215 may retrieve the latest security system information directly from the security devices identified as sharing the location with smart glasses 102. In scenario 100, smart glass UI component 215 may retrieve security system information from security device 108 by querying for a status update.

At block 308, the method 300 includes generating a UI element based on the security system information. For example, in an aspect, computing device 200, processor 205, memory 210, smart glass UI component 215, and/or generating component 235 may be configured to or may comprise means for generating UI element 110 based on the security system information.

UI element 110 is a visual element that may be any combination of an image, a video, text, and an augment reality effect. As shown in FIG. 1, for example, UI element 110 includes text detailing a first portion of the security system information and images detailing a second portion of the security system information. The first portion includes status information (e.g., locked/unlocked), historical interaction information (e.g., number of entries, number of occupants, etc., within a given period of time), and device information (e.g., a method of interaction such as scanning an employee ID card). The second portion includes a visual representation of the first portion. For example, the occupants indicated in the first portion may be represented using images, augmented reality information, and videos.

In an alternative or additional aspect, UI element 110 includes metadata indicating visual features of UI element 110 when displayed on the user interface of smart glasses 102, and wherein the visual features include at least one augmented reality effect. For example, the metadata may include a layout of the information. Smart glass UI component 215 may refer to an element database that includes information about available UI templates associated with different types of security system information. A portion of an example element database is shown in Table 2 below, where column headers identify a type of element and element parameters, and rows include corresponding values of the respective element type and parameters:

There are several examples in which smart glass UI component 215 may deliver important and relevant information to a user. For example, a user may be in an evacuation situation and may desire to exit environment 104. Depending on the location of the user (assuming the user is wearing smart glasses 102), smart glass UI component 215 may display security system information about locked doors, card readers, room occupants, etc. For example, smart glasses 102 may be provided location-relative information that can help a user decide whether to attempt going through a certain path (e.g., if a door is locked and a UI element is generated via the smart glasses that indicates as such, a user may not waste time attempting to access the door). Likewise, if an unauthorized user (e.g., an active shooter) is present behind a certain door such as conference room A18, a user may be notified using UI element 110 (e.g., an alert may be generated that an unauthorized user entered the room).

In another example, in the event of a fire, a user may be able to locate the room in which the fire is detected. For example, thermostat and a carbon monoxide detector may be security devices that indicate that a particular room has a breakout fire (e.g., the room temperature according to the thermostat is above a threshold temperature and the carbon monoxide detector detects carbon monoxide). A UI element generated by smart glass UI component 215 may include information from each of these detectors.

In an alternative or additional aspect, the security system information includes one or more of: a device status, event information, historical device information, or an access recommendation.

In an alternative or additional aspect, the at least one security device is a smart lock that enables and disables access through a security door, wherein the security system information comprises recommendation information about whether a user should access the security door based on a security event.

In an alternative or additional aspect, the security event is one of: an evacuation, a fire, flooding, or an unauthorized entry in the environment.

TABLE 2

| Element | Dimensions | Location | Text | Visuals |
|---|---|---|---|---|
| CARDREADER | 480 × 100px | Reader position | ... | "CARD READER" "Occupants:" [occ_value] "Last Entry:" [lentry_val]; "Status:" [stat_val] "Protection:" [interact_val] | AR Effect: Occupant Image Animation (50 × 50px; 20×) |
| CAMERA | 700 × 300px | (400, 400) | ... | "MOTION DETECTED" | AR Effect: Motion Capture Boundary |
| ... | ... | ... | ... | ... | ... |
| THERMOSTAT | 200 × 200px | Thermostat position | ... | "Current Temperature:" [temp_val] | AR Effect: Thermometer Object |

Using information in the element database such as dimensions of the user element, the location, the text values, and the visual attributes, generating component 235 generates a UI element such as UI element 110. The different values associated with the historical security system information are filled in variables such as [temp_val] for the thermostat.

In some aspects, generating UI element 110 may further comprise providing access recommendations during security events. Generating a recommendation may include utilizing a plurality of rules. For example, a rule may indicate that a fire alert should be generated in glasses view 106 if a carbon monoxide detector and a thermostat in the same location as the user report the detection of carbon monoxide and a room temperature above a threshold temperature, respectively. The fire alert may be shown in a UI element that is an AR effect depicting an animation of a fire or a fire fighter. Another rule may indicate that a new evacuation path alert should be generated in glasses view 106 if there is an evacuation alarm in a loudspeaker system (i.e., an audio-based security device) and the user is looking at a door that is locked.

At block 310, the method 300 includes transmitting the user interface element for display on a user interface of the smart glasses. For example, in an aspect, computing device 200, processor 205, memory 210, smart glass UI component 215, and/or transmitting component 240 may be configured to or may comprise means for transmitting the user interface element for display on a user interface of the smart glasses.

For example, computing device 200 may transmit, over a LAN or a WAN, information about the UI element to smart glasses 102. The messages comprising the UI element in the payload may be reconstructed by smart glasses 102 and subsequently displayed to create glasses view 106 shown in FIG. 1.

Figure 4:
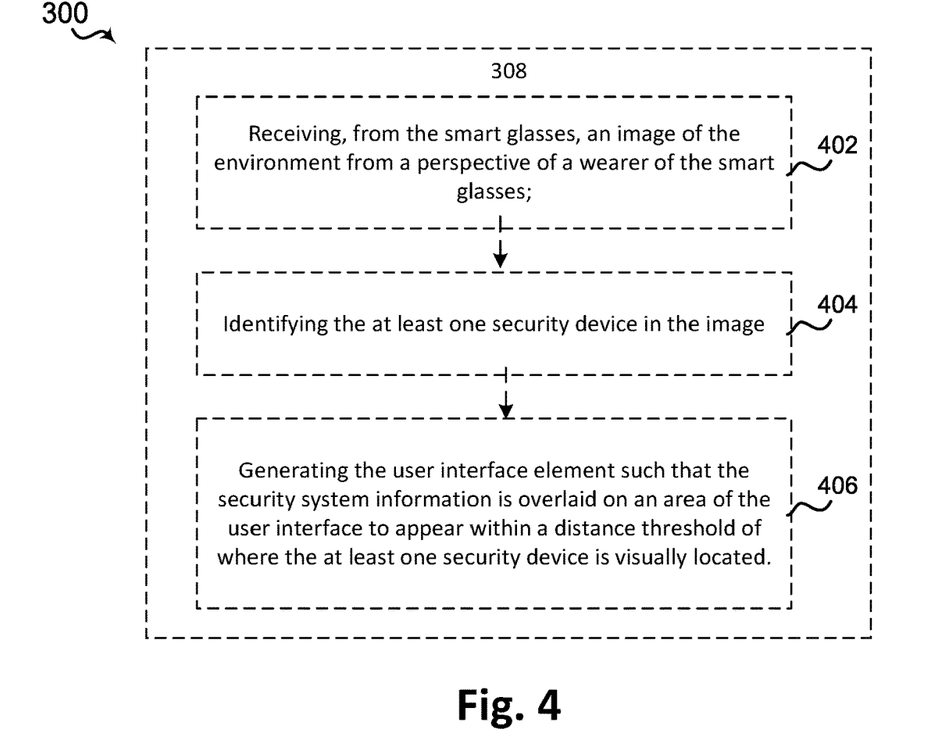
FIG. 4 is a flowchart illustrating a method for generating a user interface element, in accordance with exemplary aspects of the present disclosure.

Referring to FIG. 4, in an alternative or additional aspect wherein the smart glasses include a camera, at block 402, the generating at block 308 of the user interface element comprises receiving, from the smart glasses, an image of the environment from a perspective of a wearer of the smart glasses.

For example, the camera may be located near a lens of smart glasses 102 such that the image captured by the camera includes glasses view 106.

In this optional aspect, at block 404, the generating at block 308 of the user interface element comprises identifying the at least one security device in the image.

For example, using object detection, smart glass UI component 215 may detect security device 108. In some aspects, security device 108 may have a visible serial code or identifier that smart glass UI component 215 detects and associates with a particular security device from the security system database.

In this optional aspect, at block 406, the generating at block 308 of the user interface element comprises generating the user interface element such that the security system information is overlaid on an area of the user interface to appear within a distance threshold of where the at least one security device is visually located For example, smart glass UI component 215 may identify the area covered by the security device in the image. In reference to FIG. 1, if the rectangular area of glasses view 106 is the boundary of the image captured, smart glass UI component 215 may determine that security device 108 covers an area bounded by the coordinates (x,y): (800, 100), (850, 100), (800, 300), (850, 300). Smart glass UI component 215 subsequently positions the UI element in the vicinity of that region based on the visual attributes listed in the elements database.

Figure 5:
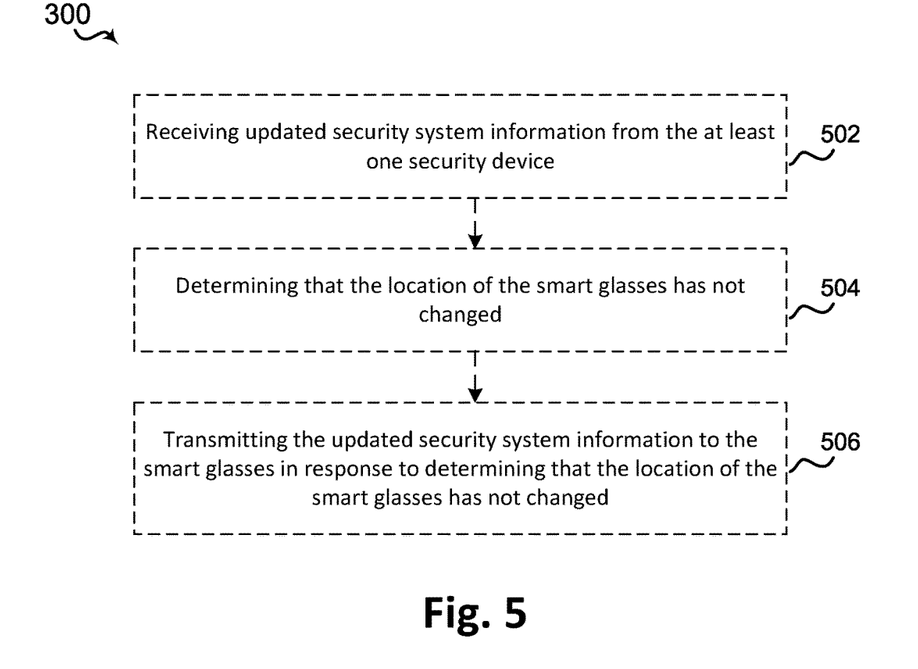
FIG. 5 is a flowchart illustrating a method for providing updated security system information through smart glasses, in accordance with exemplary aspects of the present disclosure.

Referring to FIG. 5, in an alternative or additional aspect, at block 502, the method 300 may further include receiving updated security system information from the at least one security device. For example, in an aspect, computing device 200, processor 205, memory 210, smart glass UI component 215, and/or receiving component 220 may be configured to or may comprise means for receiving updated security system information from the at least one security device.

For example, referring to FIG. 1, at a time after the UI element is transmitted, computing device 200 may received information from security device 108 that another person has entered conference room A18. Accordingly, the occupancy count is incremented by 1 and the last entry time is updated as well.

In this optional aspect, at block 504, the method 300 may further include determining that the location of the smart glasses has not changed. For example, in an aspect, computing device 200, processor 205, memory 210, smart glass UI component 215, and/or determining component 250 may be configured to or may comprise means for determining that the location of the smart glasses has not changed.

In this optional aspect, at block 506, the method 300 may further include transmitting the updated security system information to the smart glasses in response to determining that the location of the smart glasses has not changed. For example, in an aspect, computing device 200, processor 205, memory 210, smart glass UI component 215, and/or transmitting component 240 may be configured to or may comprise means for transmitting the updated security system information to the smart glasses in response to determining that the location of the smart glasses has not changed.

For example, the occupancy count and last entry time may be updated in UI element 110. In some aspects, this may simply involve transmitting new values of the security system information to smart glasses 102, which updates the UI element locally. In other aspects, this may involve generating a new UI element and transmitting the new UI element to smart glasses 102.

Because information changes over time, a user may be interested in seeing the changes between a first time t1 and a second time t2. Smart glass UI component 215 may thus receive a request to view changes in historical security system information, wherein the request includes a fast forward or rewind request. In some aspects, the smart glasses receive this request via a voice command or a button press. In other aspects, the smart glasses may be equipped with retina scanners that may receive and interpret eye movements as gestures for rewinding/forwarding. In response to receiving the request, smart glass UI component 215 may transmit a new user interface element for display on the user interface of the smart glasses, wherein the new user interface element executes the request. For example, the new user interface element may iteratively show data from time t1 to time t2 (in a forward/backward motion). The user may then select a particular set of data to view on the new user interface element, which pauses at the set of data until the user makes another selection or looks away from the security device.

Figure 6:
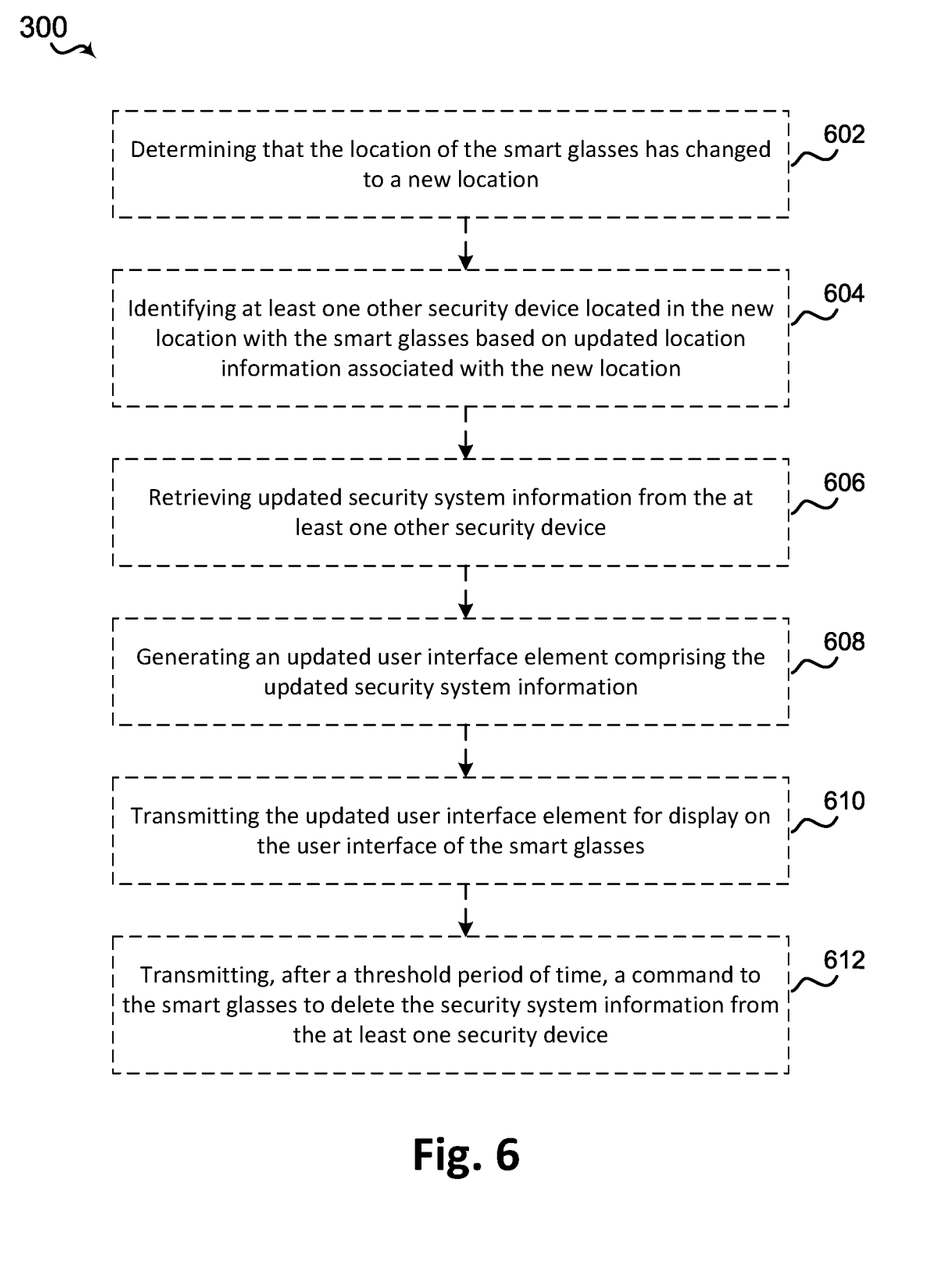
FIG. 6 is a flowchart illustrating a method for providing security system information on the smart glasses based on a location change, in accordance with exemplary aspects of the present disclosure.

Referring to FIG. 6, in an alternative or additional aspect, at block 602, the method 300 may further include determining that the location of the smart glasses has changed to a new location. For example, in an aspect, computing device 200, processor 205, memory 210, smart glass UI component 215, and/or determining component 250 may be configured to or may comprise means for determining that the location of the smart glasses has changed to a new location.

For example, smart glass UI component 215 may determine that the GPS coordinates of the smart glasses has changed by a threshold amount or that an image received from the smart glasses depicts a security device in a different location in the environment.

In this optional aspect, at block 604, the method 300 may further include identifying at least one other security device located in the new location with the smart glasses based on updated location information associated with the new location. For example, in an aspect, computing device 200, processor 205, memory 210, smart glass UI component 215, and/or identifying component 225 may be configured to or may comprise means for identifying at least one other security device located in the new location with the smart glasses based on updated location information associated with the new location.

For example, smart glass UI component 215 may determine from the security system database at least one other security device in the new location of the smart glasses.

In this optional aspect, at block 606, the method 300 may further include retrieving updated security system information from the at least one other security device. For example, in an aspect, computing device 200, processor 205, memory 210, smart glass UI component 215, and/or retrieving component 230 may be configured to or may comprise means for retrieving updated security system information from the at least one other security device.

In this optional aspect, at block 608, the method 300 may further include generating an updated user interface element comprising the updated security system information. For example, in an aspect, computing device 200, processor 205, memory 210, smart glass UI component 215, and/or generating component 235 may be configured to or may comprise means for generating an updated user interface element comprising the updated security system information.

In this optional aspect, at block 610, the method 300 may further include transmitting the updated user interface element for display on the user interface of the smart glasses. For example, in an aspect, computing device 200, processor 205, memory 210, smart glass UI component 215, and/or transmitting component 240 may be configured to or may comprise means for transmitting the updated user interface element for display on the user interface of the smart glasses.

In this optional aspect, at block 612, the method 300 may further include transmitting, after a threshold period of time, a command to the smart glasses to delete the security system information from the at least one security device. For example, in an aspect, computing device 200, processor 205, memory 210, smart glass UI component 215, and/or transmitting component 240 may be configured to or may comprise means for transmitting, after a threshold period of time, a command to the smart glasses to delete the security system information from the at least one security device.

For example, to prevent the smart glasses from storing information that is no longer relevant in its local memory, computing device 200 may transmit a command to delete data that was received and displayed more than a threshold period of time ago (e.g., 2 hours).

The present disclosure describes the utilization of smart wearable glasses that integrate the ability to display historical security data in direct comparison to the live environment the wearer is in through real-time API integration. The historical data can also be displayed with metadata from security and building devices in the area that include but not be limited to cameras, readers, controllers, smoke detectors, carbon detectors, fire detection devices, fire notification devices, HVAC, Thermostats, Lighting controls, etc. The glasses may support wearable garments, which have the ability to provide inductive charging for the glasses to ensure sustainable power. The glasses provide the support for a camera, microphone, and speakers for full two-way communications with other glass wearers and a command center.

While the foregoing disclosure discusses illustrative aspects and/or embodiments, it should be noted herein that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus at a computing device for providing security system information using smart glasses, comprising:
 a memory; and
 a processor coupled with the memory and configured to:
  receive location information of the smart glasses in an environment comprising a plurality of security devices, wherein each security device outputs unique security system information about the environment;
  identify at least one security device that is associated with a location with the smart glasses based on the location information;
  retrieve the security system information from the at least one security device;
  generate a user interface element based on the security system information;
  transmit the user interface element for display on a user interface of the smart glasses;
  receive a request to view changes in historical security system information, wherein the request includes a fast forward or rewind request for viewing statuses of the security device comprised in the historical security system information between a first point in time and a second point in time;
  transmit a new user interface element for display on the user interface of the smart glasses, wherein the new user interface element displays the changes by iteratively showing the statuses between the first point in time and the second point in time based on the fast forward or rewind request;
  receive, via the new user interface element, a selection of a set of data comprising a status of the security device; and
  pause at the set of data.

2. The apparatus of claim 1, wherein the user interface element includes metadata indicating visual features of the user interface element when displayed on the user interface of the smart glasses, and wherein the visual features include at least one augmented reality effect.

3. The apparatus of claim 1, wherein the smart glasses include a camera, and wherein to generate the user interface element comprises to:
 receive, from the smart glasses, an image of the environment from a perspective of a wearer of the smart glasses;
 identify the at least one security device in the image; and
 generate the user interface element such that the security system information is overlaid on an area of the user interface to appear within a distance threshold of where the at least one security device is visually located.

4. The apparatus of claim 3, wherein the security system information includes one or more of: a device status, event information, historical device information, or an access recommendation.

5. The apparatus of claim 3, wherein the at least one security device is a card reader of an access system that enables and disables access through a security door, wherein the security system information includes personnel identification information and/or card identification information associated with one or more cards scanned at the card reader over a period of time.

6. The apparatus of claim 3, wherein the at least one security device is a smart lock that enables and disables access through a security door, wherein the security system information comprises recommendation information about whether a user should access the security door based on a security event.

7. The apparatus of claim 6, wherein the security event is one of: an evacuation, a fire, flooding, or an unauthorized entry in the environment.

8. The apparatus of claim 3, wherein the at least one security device has a known location, wherein to receive the location information of the smart glasses comprises to:
execute a localization algorithm that assigns the location of the smart glasses to the known location based on identifying the at least one security device in the image.

9. The apparatus of claim 1, wherein the processor is further configured to:
receive updated security system information from the at least one security device;
determine that the location of the smart glasses has not changed; and
transmit the updated security system information to the smart glasses in response to determine that the location of the smart glasses has not changed.

10. The apparatus of claim 1, wherein the processor is further configured to:
determine that the location of the smart glasses has changed to a new location;
identify at least one other security device located in the new location with the smart glasses based on updated location information associated with the new location;
retrieve updated security system information from the at least one other security device;
generate an updated user interface element comprising the updated security system information; and
transmit the updated user interface element for display on the user interface of the smart glasses.

11. The apparatus of claim 10, wherein the processor is further configured to:
transmit, after a threshold period of time, a command to the smart glasses to delete the security system information from the at least one security device.

12. The apparatus of claim 1, wherein the smart glasses include a camera, and wherein to receive location information comprises to:
receive, from the smart glasses, an image of the environment from a perspective of a wearer of the smart glasses;
detect, in the image, an identifier of the location.

13. The apparatus of claim 12, wherein the identifier of the location is a number, an object, a visual sign, or a unique code.

14. A method at a computing device for providing security system information using smart glasses, comprising:
receiving location information of the smart glasses in an environment comprising a plurality of security devices, wherein each security device outputs unique security system information about the environment;
identifying at least one security device that is associated with a location with the smart glasses based on the location information;
retrieving the security system information from the at least one security device;
generating a user interface element based on the security system information;
transmitting the user interface element for display on a user interface of the smart glasses;
receiving a request to view changes in historical security system information, wherein the request includes a fast forward or rewind request for viewing statuses of the security device comprised in the historical security system information between a first point in time and a second point in time;
transmitting a new user interface element for display on the user interface of the smart glasses, wherein the new user interface element displays the changes by iteratively showing the statuses between the first point in time and the second point in time based on the fast forward or rewind request;
receiving, via the new user interface element, a selection of a set of data comprising a status of the security device; and
pausing at the set of data.

15. The method of claim 14, wherein the user interface element includes metadata indicating visual features of the user interface element when displayed on the user interface of the smart glasses, and wherein the visual features include at least one augmented reality effect.

16. The method of claim 14, wherein the smart glasses include a camera, and wherein generating the user interface element comprises:
receiving, from the smart glasses, an image of the environment from a perspective of a wearer of the smart glasses;
identifying the at least one security device in the image; and
generating the user interface element such that the security system information is overlaid on an area of the user interface to appear within a distance threshold of where the at least one security device is visually located.

17. The method of claim 16, wherein the security system information includes one or more of: a device status, event information, historical device information, or an access recommendation.

18. The method of claim 16, wherein the at least one security device is a card reader of an access system that enables and disables access through a security door, wherein the security system information includes personnel identification information and/or card identification information associated with one or more cards scanned at the card reader over a period of time.

19. The method of claim 16, wherein the at least one security device is a smart lock that enables and disables access through a security door, wherein the security system information comprises recommendation information about whether a user should access the security door based on a security event.

20. The method of claim 19, wherein the security event is one of: an evacuation, a fire, flooding, or an unauthorized entry in the environment.

* * * * *